United States Patent [19]

Kato

[11] Patent Number: 5,655,862
[45] Date of Patent: Aug. 12, 1997

[54] MACHINE TOOL SPINDLE

[75] Inventor: Fumihiko Kato, Aichi-ken, Japan

[73] Assignee: Brother Kogyo Kabushiki Kaisha, Aichi-ken, Japan

[21] Appl. No.: 494,166

[22] Filed: Jun. 23, 1995

[30] Foreign Application Priority Data

Jun. 24, 1994 [JP] Japan ................................. 6-142935

[51] Int. Cl.$^6$ ........................... B23C 5/26; F16C 3/00
[52] U.S. Cl. ........................ 409/231; 384/130; 384/227
[58] Field of Search ................................ 409/233, 231, 409/234; 384/130, 227, 607, 415

[56] References Cited

U.S. PATENT DOCUMENTS

| | | | |
|---|---|---|---|
| 4,063,488 | 12/1977 | Kagerer | 409/233 |
| 4,632,613 | 12/1986 | Wollermann | 409/233 |
| 4,697,965 | 10/1987 | Ida et al. | 384/130 X |
| 4,836,723 | 6/1989 | Flammini | 409/141 |
| 5,244,322 | 9/1993 | Schweizer et al. | 409/233 |
| 5,487,628 | 1/1996 | Suzuki | 409/135 |

FOREIGN PATENT DOCUMENTS

| | | | |
|---|---|---|---|
| 3702851 | 8/1988 | Germany | 409/233 |
| 6206103 | 7/1994 | Japan | 409/233 |
| 588074 | 1/1978 | U.S.S.R. | 409/233 |

*Primary Examiner*—William R. Briggs
*Attorney, Agent, or Firm*—Kane, Dalsimer, Sullivan, Kurucz, Levy, Eisele and Richard, LLP

[57] ABSTRACT

A machine tool has a spindle with a splayed taper at the tool-holding tip, the taper expanding outwards in the direction away from the supporting bearings. Due to centrifugal forces, any cutting fluid (scattered by cutting operations) that reaches the surface of the taper tends to move on the surface of the taper and scatter away from the bearing, avoiding the intrusion of cutting fluid into the bearing. A flange having an internal taper matching the splayed taper of the tool-holding tip can be provided around the tip, making it more difficult for cutting fluid to reach the clearance between the tapers and further encouraging any intruding fluid to move and scatter away from the bearing.

6 Claims, 4 Drawing Sheets

5,655,862

MACHINE TOOL SPINDLE

BACKGROUND OF THE INVENTION

The present invention relates to machine tool spindles, and specifically to the sealing arrangement at the tool-holding end of a machine tool spindle.

Conventionally, a machine tool using rotating cutting tools supported by a machine tool spindle scatters cutting fluid, sometimes including debris and removed material, at the time of processing a workpiece. The scattered cutting fluid, sometimes including debris and removed material, can intrude into the spindle support bearings. The life of the bearings can become significantly shortened, especially in the case of rolling-contact bearings. The cutting fluid can shorten the life of a bearing by deteriorating the lubricant used therein, or by the influence of debris borne by the cutting fluid.

In order to delay the entry of cutting fluid into the bearings, the spindle and support are usually arranged with a seal therebetween. However, for high-speed spindles, the seals must be non-contact seals, for example using a complex path at the tool bearing end, such as one or more labyrinth seals.

FIG. 1 shows a sectional view of a conventional machine tool spindle, while FIG. 2 shows a sectional view of the spindle sleeve and seal area. As illustrated in FIGS. 1 and 2, a conventional tool sleeve 36 is provided at the lower end 18 of the spindle 34, which is rotatably supported on the housing 24 via the bearing 32. A conventional flange 40 is attached to the housing 24 at the lower end thereof, forming a clearance 38 between the bore of the flange 40 and the lower end 18 of the spindle 34. A labyrinth seal 42 is provided inside the flange 40.

The labyrinth seal 42 is capable of delaying the intrusion of cutting fluid into the area of the bearing 32. However, the use of the labyrinth seal 42 does not encourage the discharge of cutting fluid that already intruded into the clearance 38 area.

SUMMARY OF THE INVENTION

It is therefore an object of the present invention to provide an improved machine tool spindle structure that positively discharges cutting fluid intruding into the seal area near the spindle bearing, to protect the bearings and spindle support.

In order to meet the objects of the invention, a machine tool includes: a housing, and a spindle rotatably mounted in the housing with a tool holding portion at the spindle tip. The outer circumferential surface of the spindle tip is tapered, with the taper expanding outwards towards the spindle tip.

In this manner, the difference in centrifugal forces between small diameter portions and large diameter portions of the rotating tapered surface encourages fluid on the tapered surface to move to portions of larger diameter, and furthermore, makes the fluid more likely to scatter from the larger diameter portions. Since the lower end portion is tapered to expand in the direction towards the spindle tip and away from the bearing, any cutting fluid tends to move and to scatter away from the bearing Preferably, the machine tool further comprises a surrounding portion provided to the housing for surrounding the spindle at the spindle tip. In this case, the inner circumference of the surrounding portion faces the taper of the spindle tip, and the inner circumferential surface tapers to expand outwards in the same direction as the spindle tip. Fluid scattered from the splay tapered spindle tip is caught on the surrounding portion and tends to move in the direction of the expansion of the taper. In one particular case, wherein the taper of the inner circumferential surface of the surrounding portion conforms to the shape of the taper of the spindle tip with a constant clearance between over facing portions of the tapers. In another particular case, the surrounding portion is a flange secured to the housing and surrounding the spindle tip.

Optionally, a labyrinth seal is interposed between the bearing and the taper of the spindle tip.

DESCRIPTION OF THE ACCOMPANYING DRAWINGS

DESCRIPTION OF THE EMBODIMENTS

Figure 1:
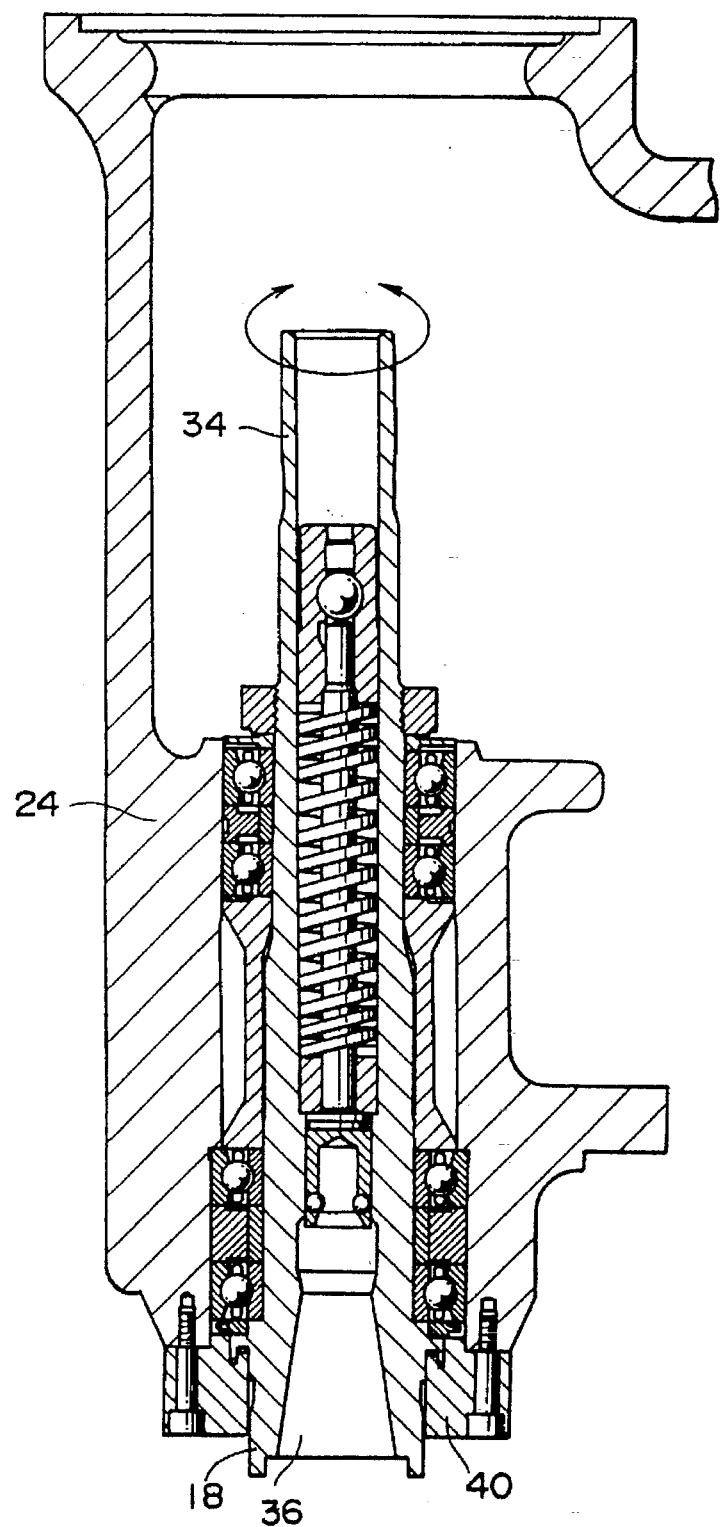
FIG. 1 is an explanatory view showing the construction of a conventional spindle head of a machine tool.
Figure 2:
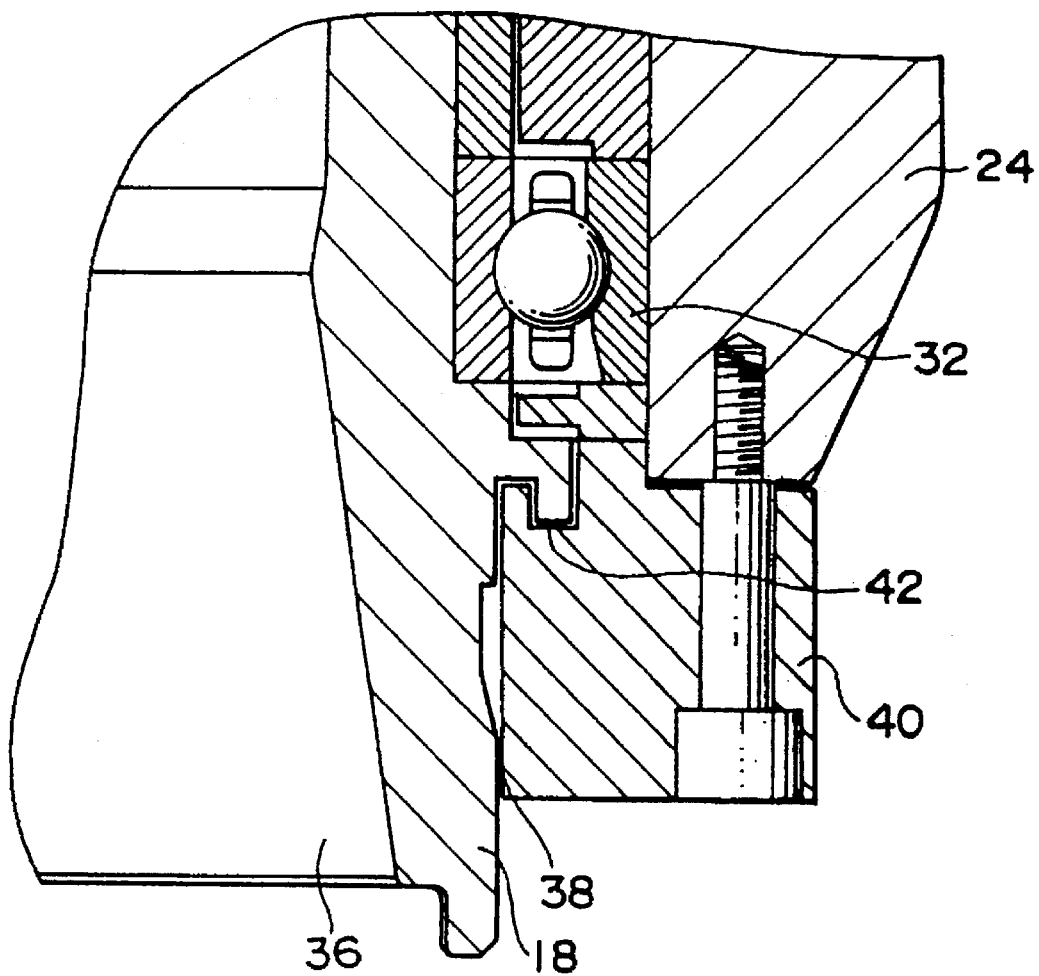
FIG. 2 is an explanatory view showing detail in the flange region of the conventional spindle head.
Figure 3:
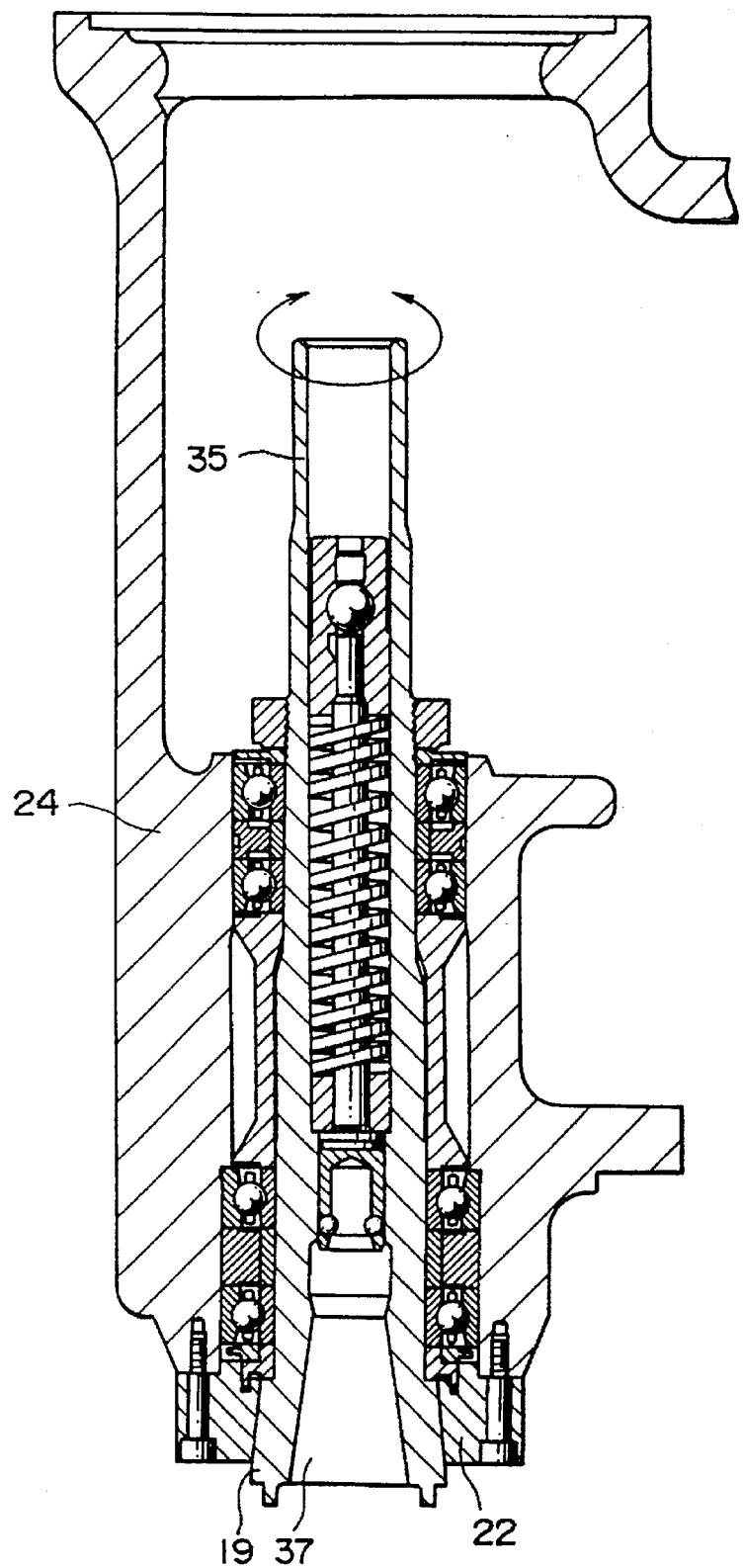
FIG. 3 is an explanatory view showing the construction of a spindle head of a machine tool including an embodiment of the present invention.
Figure 4:
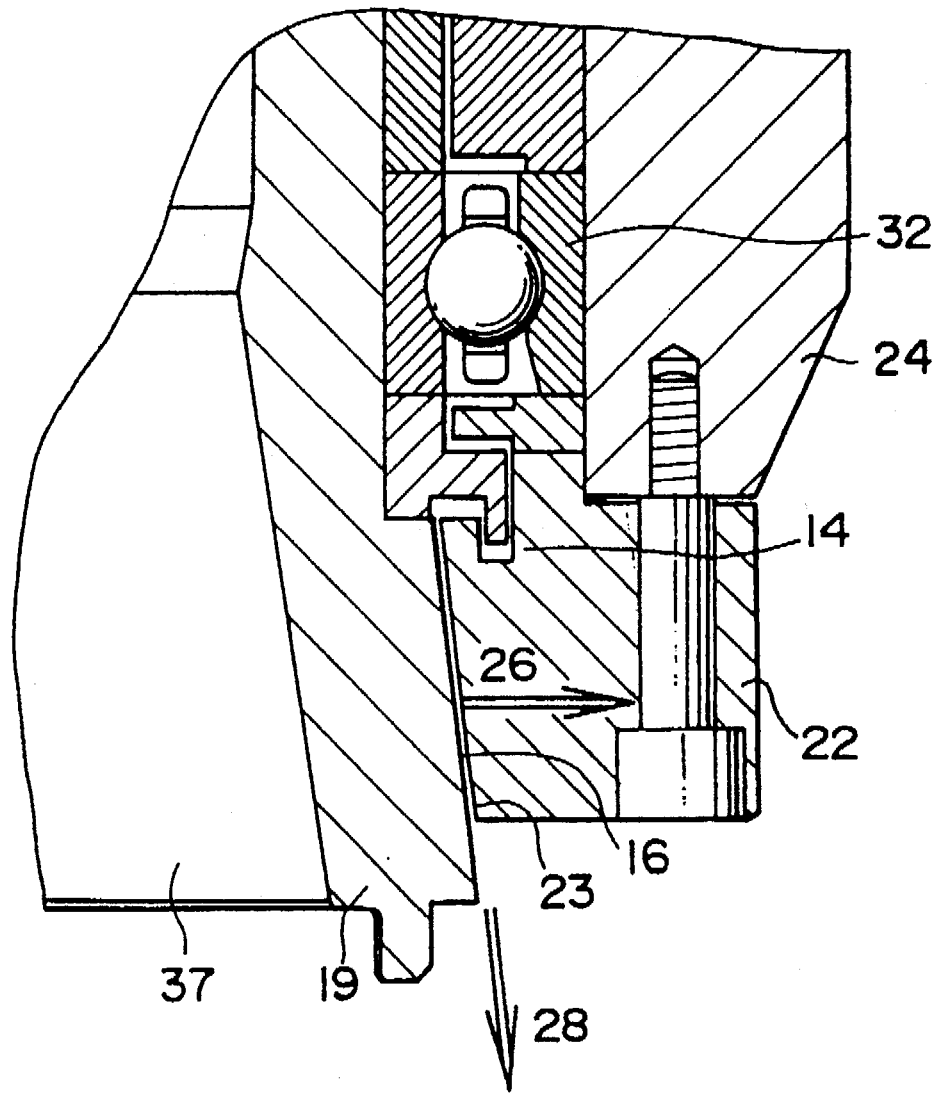
FIG. 4 is an explanatory view showing detail in the flange region of the spindle head including the embodiment of the present invention.

FIGS. 3 and 4 show a machine tool spindle 35 according to an embodiment of the present invention. FIG. 4 shows the region of the lower end portion 19 (tip) of the spindle 35.

The lower end portion 19 (tip) of the spindle 35 has a sleeve portion 37, the sleeve portion 37 formed internally as a tapered sleeve to receive an arbor or a shank of a cutting tool. The outer circumferential surface 16 of the lower end 19 is formed to be splay tapered, with the taper expanding towards the lower end of the spindle 35. The spindle 35 is rotatably supported in a housing 24 by bearings 32.

A flange 22 is secured at the lower end of the housing 24. The flange 22 surrounds the lower end portion 19 of the spindle 35. The inner circumferential surface 23 of the flange 22 is also formed to be splay tapered, expanding outwards towards the lower end of the spindle 35, and the inner circumferential surface 23 of the flange 22 corresponds to the outer circumferential surface 16 of the lower end portion 19 of the spindle 35, with a small clearance therebetween. When the spindle 35 is rotated, there is no contact between the outer circumferential surface 16 of the lower end portion 19 of the spindle 35 and the inner circumferential surface 23 of the flange 22. A labyrinth seal 14 is formed internally in the flange 22 to match a corresponding labyrinth portion provided to the spindle 35.

When a workpiece (not shown) is cut by a tool held in the sleeve 37, scattered cutting fluid may intrude into the clearance between the inner circumferential surface 23 of the flange 22 and the outer circumferential surface 16 of the lower end portion 19 of the spindle 35, towards the bearing 32. However, by means of the centrifugal forces generated by the rotation of the spindle 35, cutting fluid in the clearance scatters in the direction 26. As both of the surfaces 23, 16 in the clearance are tapered to expand outwardly towards lower ends of the housing and spindle, a force in the discharge direction 28 is added to that in the direction of scattering 26, and the intruding cutting fluid is thereby discharged. Another way of expressing this concept is that the difference in centrifugal forces between small diameter portions and large diameter portions of the rotating tapered surface 16 encourages fluid on the surface 16 to move to portions of larger diameter, and furthermore, makes the fluid more likely to scatter from the larger diameter portions. Since the lower end portion 19 is tapered to expand in the direction away from the bearing 32, any cutting fluid tends to move and to scatter away from the bearing 32.

In this embodiment, the labyrinth seal 14 is shown to be formed in the case that the cutting fluid is able to intrude into the bearing 32 area, against the centrifugal force as described. Therefore, when the cutting liquid is completely prevented from intruding into the bearing 32 area by the arrangement of the tapered surfaces 16, 23, then the labyrinth seal 14 is not strictly necessary.

According to the invention, upon the rotation of the spindle, intruding cutting fluid is discharged from the clearance between the spindle and housing by means of centrifugal forces generated at the expanding taper of the front sleeve end (lower end portion, or tip, 35) of the spindle. The cutting liquid is forcibly discharged away from the bearing 32, and the lives of the bearing 32 and spindle 35 are therefore extended.

What is claimed is:

1. A machine tool, comprising:

a housing;

a spindle, rotatable mounted in said housing via at least one bearing, said spindle being provided with a tool holding portion at a tip of said spindle, a seal interposed between said bearing and said spindle tip, and an outer circumferential surface of said spindle tip, said outer circumferential surface being tapered with a constant taper expanding outwards towards said spindle tip and extending from said seal to the exterior of said housing.

2. The machine tool according to claim 1, further comprising:

a surrounding portion provided in said housing and surrounding said spindle at said spindle tip, the inner circumference of said surrounding portion tapers at the same angle as said spindle tip to expand outwards in the same direction as said spindle tip and to provide a constant clearance between said spindle tip and said surrounding portion.

3. The machine tool according to claim 1, wherein said surrounding portion is a flange secured to said housing and surrounding said spindle tip.

4. The machine tool according to claim 2, wherein said holding portion is provided at a lower end portion of said spindle.

5. The machine tool according to claim 4, wherein said seal is a labyrinth seal interposed between said bearing and said taper of said spindle tip.

6. The machine tool according to claim 4, wherein said tapering expands in a direction away from said at least one bearing.

* * * * *